3,251,704
COMPOSITIONS AND PIGMENTS
Alfred H. Nellessen, Roseville, Minn., assignor to Minnesota Mining and Manufacturing Company, St. Paul, Minn., a corporation of Delaware
Filed Apr. 17, 1961, Ser. No. 103,387
18 Claims. (Cl. 106—193)

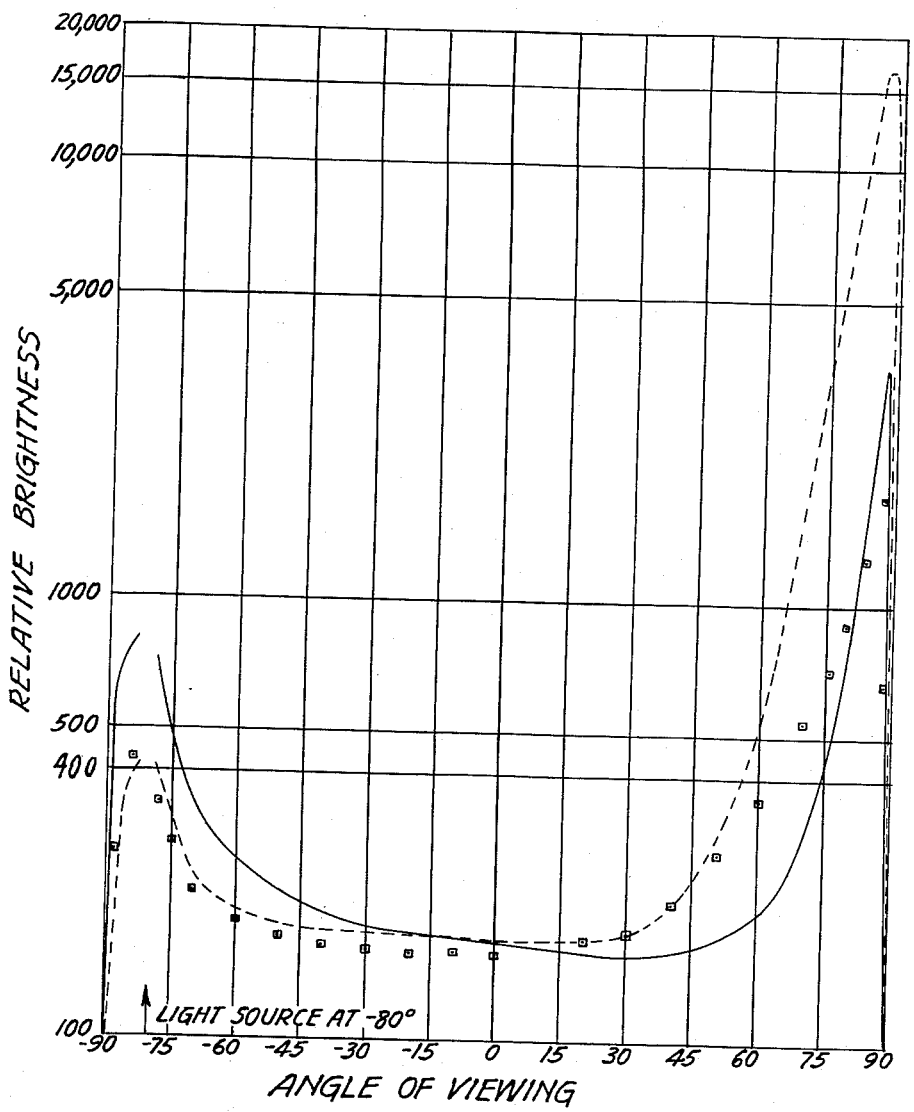

This application is a continuation-in-part of my application Serial No. 784,850, filed January 5, 1959, which was abandoned in favor of this application.

This invention relates to specialized compositions and to pigments useful in making the same.

The invention provides masses of spheroidal pigment particles in the form of clusters of pigment powder held together by a transparent binder. These pigment clusters may be marketed for admixture with paint-like coating compositions to give a variety of attractive effects, or they may be dry-sprayed on tacky coatings to give attractive light-scattering and coloration, etc.

Surprisingly attractive and luxurious, essentially nonglare finishes may be formed by coating and drying paint-like compositions of the invention which contain the pigment cluster particles hereof.

The invention also relates to liquid paint-like coating compositions inherently adapted to provide, immediately upon drying, a surface layer of optically exposed sphere lens elements in combination with non-metallic colored pigment particles between the lens elements for coloration of the coating. Compositions of this type are provided, which can be applied to desired base surfaces by brush, knife coat, screen process and spray methods, similarly to the application of conventional paints, to provide a coating which presents a colored (chromatic or achromatic) painted appearance under normal daytime viewing, as well as optically exposed sphere lens elements in just the proper optical relationship for night-time reflex-reflection.

As a specific illustration, compositions of the reflex-reflecting embodiments hereof which contain a white pigment may be used to paint signs and markings directly upon railroad box cars and the like, to obtain resulting signs and markings which exhibit a desired white appearance under normal daytime viewing and which additionally possess desired nighttime reflex-reflection properties.

The inherently reflex-reflecting characteristics of these dried coatings are due to the conjoint optical properties of an optically exposed surface layer of minute glass beads (transparent glass microspheres) in combination with a reflective material associated with back surfaces of the beads. The microspheres serve as sphere lenses and refract light rays impinging on them, both before and after reflection from the underlying reflective material, in such a way that a brilliant cone of light is reflected back toward the source of light. This is true even when the painted marker is illuminated by a beam of light which strikes it at a substantial angle away from the perpendicular as is commonly the case when markers are illuminated by the headlight beam of a vehicle moving along the road. The result is that the painted marker appears much brighter to the occupants of the vehicle than does a conventional painted marker which lacks this reflex-reflecting characteristic. The marker thus attracts greater attention and is readily visible at much greater distances.

Reflex-reflection of light has now come to be a well-recognized term to describe this ability of a surface to return light back toward its source, even though the incident beam of light may strike the surface at an angle other than normal. The principle is discussed in detail in several prior art patents, e.g., Gebhard et al., No. 2,362,634, Palmquist et al., No. 2,407,680, and Heltzer, No. 2,574,971; and teachings from these prior art patents are here incorporated by reference.

Contrary to reflex-reflection prior art teachings, however, I have found that color pigmented, liquid reflex-reflecting coating compositions may be provided which, upon drying after application as a layer upon a base substrate, give a surface layer of desired pigmented color appearance as well as optically exposed transparent glass microspheres available for immediate reflex-reflection.

The compositions of this invention adapted to provide reflex reflection of light, as well as others hereof, are to be distinguished from beaded highway marking paints which have been employed for over ten years and were described by Heltzer in his application filed in 1945, now U.S. Patent No. 2,574,971, and in a court opinion concerning that patent, reported in 132 F.S. 640, 105 USPQ 416. That paint, as is well known, provides a marker on the highway surface that is not reflex-reflecting in its initial dried state, the beads being covered over by an opaque reflective paint film that optically masks the beads. Reflex-reflection does not occur until the action of weathering and traffic wear has removed the paint sufficiently from the tips of the beads to expose them so they can function as lens elements, which ordinarily requires several weeks before efficient reflex-reflection is developed.

The present reflex-reflecting result is that of obtaining a colored pigmented appearance and efficient reflex-reflecting optical relationships immediately upon drying, a result not heretofore believed possible. The result is an inherent characteristic of my compositions. While the exact formulation of these reflex-reflecting compositions may vary, they have several critical features in common. All contain a transparent varnish vehicle, transparent glass microspheres, and nonmetallic colored pigment particles of a size distribution in the range of at least 2 microns up to about 70 microns in diameter with little or no fines smaller than 2 microns in diameter.

The present reflex-reflecting coating system permits of several different expedients for obtaining efficient reflex-reflection under night-time viewing conditions. Use can be made of transparent glass microspheres (glass beads) that are hemispherically reflectorized by being silvered or otherwise metal-plated on approximately one-half of the surface. These beads point every whichway in the dried coating and a beam of incident light will be retrodirectly reflected from those beads which are optically exposed so that the light can enter the bead and be reflected from the metal coating at the back surface of the bead. Another expedient is to include finely divided reflective metal flake powder (such as aluminum flake pigment) in the coating composition, these reflective metal flakes orienting themselves around the backs of the beads during drying of the coating and leaving the fronts of the beads optically exposed to incident light rays. Still another expedient is to apply a coating composition of beads and nonmetallic colored pigment to a base structure having a shiny metallic reflective surface, so that incident light rays can penetrate the beads and be reflected from the metallic back surface.

A dried coating of the reflex-reflecting type contemplated by this invention has a spherulate or lenticular surface caused by the presence of the glass beads. When the composition is coated, the glass beads and pigment particles shift position in the coating layer (the pigment particles slither or slide off the tops of beads), with the result that the dried coating contains beads in essentially a monolayer with pigment particles nestled and stacked between the beads of the coating leaving the portion of the beads nearest the exposed portion of the coating essentially free of contaminating pigment and optically exposed to the atmosphere or outer surface. The beads are therefore exposed to serve immediately as lens elements in a system for reflex-reflection of light. Varnish solids form a thin skin over the beads and pigment particles, and the resulting surface of the dried coating is spherulate or lenticular.

The term "varnish" is employed here in its broad sense and includes not only oil and spirit resin varnishes but lacquers as well, which provide adequately durable transparent film coatings when coated and dried. Alkyd resin varnishes have been employed by me in obtaining reflective coatings having prolonged resistance to outdoor exposure including resistance to darkening by the sun's rays. Nitrocellulosic lacquer signs have proved satisfactory for some sign uses. The varnish vehicle employed is preferably thixotropic, having a "false body," which appears to assist the process of relocation of the transparent glass microspheres (where varied quantities of such are employed in the coating composition) as well as the opaque color pigment particles in an applied coating. Thixotropic vehicles also serve to retard settling of color particles (as well as beads when they are present) during storage of the composition. The inclusion of a small proportion (preferably a fraction of a percent) of a colloidal suspending agent in coating compositions hereof is advantageous in producing a more stable and thixotropic suspension of beads and color particles. Illustrations of such additives are the organic derivatives of bentonite sold under the trade mark "Bentone." Even when prolonged storage has resulted in marked settling of beads and pigment, they can be redispersed before using the composition by vigorous agitation or stirring, as by means of a paint shaker or propeller mixer. Thus, it is emphasized that it is not essential to employ thixotropic vehicles or the like. Older well-known lacquers or varnishes may be useful, and any settling problems during storage may be taken care of by agitating the composition immediately prior to coating, as in conventional well-known paint practice.

It is important that the varnish composition be one which contributes to the mobility of the applied composition as a whole so as to permit relocation of beads and color particles in the applied coating. Such mobility is inherently satisfied by the usual varnish compositions of commerce. Thus, varnishes which become thick and viscous on standing, but which are readily fluidized by agitation, are suitable, as well as varnish compositions which contain substantial amounts of volatile solvents (e.g., as much as 95% solvent). In general, varnish vehicles formulated so as to contain non-volatile binder solids in the weight range of 10 to 40% (and correspondingly 90 to 60% of volatile solvent material) are particularly useful in the practice of the invention, but others outside these more preferred limits may be used to gain useful results.

In connection with those compositions hereof containing glass beads, it is noted that the optimum glass bead size for obtaining good functional efficiency, coatability, and dispersion and suspension in the varnish vehicle, is in the range of about 15 to 75 microns in diameter. A micron is a thousandth of a millimeter.

The beads in the composition designed to give the more efficient type of reflex-reflection must have a refractive index of at least about 1.8. The use of "about 1.8" is to be interpreted in its broad sense, permitting a whole number variation in the figure preceded by the decimal. The optimum value is about 1.9 to obtain efficient reflex-reflection when the coating procedure results in a spherulate varnish surface exposed to the atmosphere for viewing under normal dry conditions. The optimum value is about 2.5 if the spherulate surface is covered with water under viewing conditions. A composition containing a mixture of beads of about 1.9 index and of about 2.5 index (usually about equal parts, but the amount of each refractive index may vary widely) has advantages when used for coating outdoor surfaces exposed to wetting by water or rain (as in the case of marker buoys and bridge abutments), since the two types of optimum reflex-reflecting efficiencies when the spherulate surface contacts air or water, respectively. Beads of such high refractive indices are to be distinguished from ordinary glass beads, which have a refractive index of about 1.5 and cannot be used for present efficient reflex-reflection purposes.

The nonmetallic colored pigment particles for my compositions are resistant to crumbling and are inert in that they are not chemically reactive with the varnish vehicle. They are opaque, or semi-opaque, and thus are to be distinguished from transparent particles. Nodular shapes for the particles are preferred; but a wide variety of shapes may be employed with satisfactory results in the reflex-reflecting compositions. Useful pigment particles may contain powders of elements or inorganic or organic compounds held together in discrete crush-resistant particles of the required size range distribution by a silicate or equivalent binder; thus the color of useful pigment particles for the practice of this invention may vary considerably throughout the chromatic and achromatic range. Even translucent fluorescent pigment particles of the required size range are useful.

It is essential, however, that the colored pigment particles for my reflex-reflecting compositions have a diameter of at least 2 microns and be essentially free of fines or particles smaller than 2 microns. Insofar as I am aware, none of the ordinary paint pigments of commerce (e.g., carbon black, lead titanate, lithopone, titanium dioxide, white lead, zinc oxide, whiting, asbestine, etc.) satisfy the requirements for the pigment particles hereof. The average particle size of most representative paint pigments of commerce is well below 2 microns; and where the average size of such pigment particles may range above 2 microns, they also are noted to contain a substantial content of fines or particles smaller than 2 microns in diameter. The addition of sufficient conventional pigments of commerce to beads plus a varnish vehicle to gain significant daytime coloration of a coating results also in masking the beads in a dried layer, which, as evident from prior art concepts, drastically interferes with gaining reflex-reflection relationships immediately upon drying. Insofar as I am aware, therefore, pigments of commercial usage in the manufacture of conventional paints are not suitable without modification, to employ in the compositions of this invention. On the other hand, existing pigments of commerce may be modified or treated so as to form pigment particles in the range of at least 2 microns in diameter up to about 70 microns in diameter with essentially no fines smaller than 2 microns. A suitable procedure for accomplishing this is as follows: Existing pigments of commerce may be blended with sodium silicate solutions and atomized. Tiny spherical clusters of pigment bonded together with sodium silicate are thus formed. The sodium silicate rapidly gels and dries sufficiently so that the spherulate particles do not stick together as they fall into a collection hopper. If weather-resistant pigment particles are desired, the mass of particles so formed may be treated with an acid solution to neutralize the sodium silicate binder. Where still further resistance to weathering is desired, the particles may further be treated by firing at raised temperatures. The atomized and treated material is essentially free of fines smaller than 2 microns in diameter, which is vital in the practice of the reflex-reflecting embodiments of this invention; and useful particle sizes are in the range of at least 2 microns up to about 70 microns in diameter. While the foregoing procedure is useful to convert conventional pigments of commerce into useful ones for the practice of this invention, it should be realized that solid chunks of pigment may be ground or milled into particles in the size range required for the reflex-reflecting embodiments hereof, and any particles outside the useful size range separated as by screening, classification by using water or air, etc. Additionally, useful pigment particles of the required size may be formed by crystal growth techniques. Generally, the larger pigment particles within the size range aforenoted are useful particularly in compositions wherein larger glass beads are employed.

An important factor for consideration in formulating the reflex-reflecting compositions is that of the Bead plus Pigment Volume Concentration, by which is meant the percent ratio of the volume of glass beads and pigment color particles to the summation of the volume of glass beads plus the volume of pigment color particles plus the volume of vehicle solids (varnish solids on a dry basis). The volume of the beads means the actual volume of the beads themselves, and not the bulk volume of the mass. Likewise, the volume of the pigment color particles means the actual volume of pigment particles themselves, and not the bulk volume of a mass thereof. The volume per unit of weight of each of the materials can readily be determined so as to facilitate making the computation from weight data. The bead plus pigment volume concentration should be in the range of about 50 to 85%. Too low a value results in inadequate flow-off of binder and pigment particles from the bead tops. Too high a value results in a dried coating that is too weak and gives a poor bond. If the composition is to be applied to porous base surfaces that will absorb appreciable binder solids from the wet applied coatings, thereby materially reducing the proportion of binder solids in the coating proper and unduly increasing the bead plus pigment volume concentration thereof, allowance must be made for this in compounding the coating composition by including a correspondingly greater proportion of binder solids. In this situation, it is preferable to employ a varnish having a gellatinous body so as to prevent or minimize absorption by porous base surfaces. Thus, while a bead plus pigment volume concentration in the range of 50 to 85% is preferred, it is also true that useful compositions may be formulated so as to fall outside such preferred range of concentration, particularly when they are to be applied to porous substrates or where they may be used, for example, in relatively temporary decorative applications.

In addition to having a bead plus pigment volume concentration between about 50 and 85%, the composition should have a relationship of bead volume to bead plus pigment volume within the range of about 20 to 90% (a volume ratio of beads to pigment particles between about 1:4 and 9:1). Where the volume ratio of beads to pigment particles falls below about one-fourth, the drop-off of refex-reflecting properties is particularly noticeable. Conversely, where the volume ratio of beads to pigment particles is in excess of 9:1, the benefit of coloration of the coating introduced by the pigment particles becomes somewhat less than ordinarily desired. Preferred compositions have a volume ratio of beads to pigment color particles between about 2:3 and 4:1. Here also, the factors to consider are as outlined, but again it is emphasized that useful results may be gained over a wide range of relationships. Indeed, as bead content is reduced, loss of reflex-reflection opportunities occur, but the gaining of attractive non-glare coatings according to principles elucidated hereinbelow may be retained; and such coatings (with extraordinary low bead contents) may also, under the necessary conditions for reflex-reflection, exhibit a satisfactory level of such reflection to be useful as a reflex light reflector during the nighttime.

A dried coating of compositions hereof particularly useful in reflex-reflecting applications provides a reflective area having a vast number of reflex-reflecting spots per square inch or square centimeter, each consisting of a minute glass bead having a reflector associated or contiguous with its back surface and thus forming a reflex-reflecting catadioptric combination. The human eye cannot distinguish between light rays emanated from adjacent individual spots and so the reflex-reflective area appears to the viewer of the sign or marker as a uniform continuous area. The viewer's reaction under reflex-reflecting viewing conditions is that the area is coated with an extraordinary brilliant paint. This is true even when the incidence of the illuminating light beam is at a substantial angle from the perpendicular when the sign is viewed by a person located near the axis of the incident light. Hence the signs possess what is known as good reflex-reflection "angularity," also known as "wide angle" reflex-reflection. This means that highway signs and markers have good nighttime visibility to motorists even when they do not face substantially directly toward the observer, and even when they have a curved surface.

In contrast, a mirror-type of sign or marker provides specular reflection and returns reflected rays toward the source only when the angle of incidence is zero (i.e., when the rays impinge perpendicularly to the surface of the mirror). A surface coated with a conventional aluminum paint (dried varnish containing leafed out aluminum flakes) provides semi-specular reflection; and visibility is poor for persons located near the axis of an angularly incident beam of light. Signs and markers of these types must be viewed from approximately dead-ahead to have good visibility. This prevents general utility for roadside signs and markers, since they are ordinarily so located that they can be viewed from dead-ahead (if at all), for only an instant from a rapidly moving vehicle.

An ordinary painted or enameled sign surface provides non-specular or diffuse reflection, owing to the reflective characteristic of the jagged pigment particles which causes a beam of light to be reflected in all directions. Some light rays are reflected in the direction of the source of an angularly incident beam of light, but most of the light is scattered in other directions, with a relatively high concentration of reflected light (a sheen or glare) at an angle essentially equal but opposite to the incident beam. Glossy enameled surfaces exhibit specular surface reflection in addition to the diffused reflection provided by the pigment particles, which further reduces nighttime visibility to persons located near the axis of an angularly incident beam of light.

In markers formed from coating compositions of the reflex reflection embodiments hereof, diffuse reflection of light, giving the appearance of an ordinary painted or even flat enameled sign on the superficial observation permitted by the driver of a moving automobile, takes place under ordinary daytime viewing conditions, but reflex-reflection of light also is accomplished by the same markers. Their nighttime visibility is surprisingly high, particularly in view of their attractive daytime appearance as compared to the grayish appearance of, for example, known reflex-reflecting coatings consisting of beads plus metallic reflective pigment in a varnish binder.

It will readily be understood that the compositions of this invention may be formed by using transparent colored glass beads (e.g., glass beads with infused metal salts or complex ions for coloration as well known in the art of glass making), by using transparent colored varnishes (e.g., essentially transparent colorants such as, for example, benzidine yellow), etc., to further improve the color appearance of a sign or marker or other surface during daytime viewing, or even during nighttime viewing under conditions other than those required for reflex reflection. Such expedients may also be used to impart color to a sign or marker under reflex-reflecting conditions at nighttime. Mixtures of pigment particles in a size range as aforespecified may be employed for added attractiveness of resulting signs or other painted surfaces. Colorants of a wide variety may be used in fabricating silicate or other pigment particles for any use as described herein, e.g., medium chrome yellow, chrome orange, alkali resistant red organics, red iron oxides, cadmium reds, ultramarine blue, carbon black, titanium dioxide, etc. Tinting dyes such as, for example, phthalocyanine blues and greens, may be added. Where heat-sensitive colorants are employed and are formed into required particle sizes using a silicate binder, heat-treatments for the particles should usually be conducted at temperatures below those destructive of the colorant, unless the modified color obtained at higher temperatures is desired.

The compositions hereof may be utilized in aerosol or "spray-can" applicators from which the composition can be sprayed on any desired surface. The pressure is provided by a volatile propellent liquid having a high vapor pressure that is included in the vessel. For example, reflective coating compositions formed according to this invention may sprayed on bridge abutments, concrete curbings, posts, tree trunks, etc. They may be sprayed over stencils for printing, etc.

The invention also permits of obtaining reflex-reflecting coating structures having a smooth flat outer surface instead of the spherulate or lenticular exposed surface resulting when the composition containing the transparent glass microspheres is applied and allowed to dry. For example, a smooth flat outer surface can be formed by coating the spherulate or lenticular surface of a dried bead containing layer with a transparent varnish, colored or clear, which covers the protrusions and provides, when dry, a flat outer surface. In this situation, the theoretical optimum effective refractive index of the beads is about 2.8 but a lower value can be used with good results. As is known in the art, the effective refractive index of a bead can be increased by providing the bead with a concentric transparent coating (either clear or colored) having a lower refractive index, so that the focal relationship of the bead and back reflector in the final coating structure is altered to produce a reflection characteristic similar to that obtainable with a uniform sphere lens of higher refractive index, thus avoiding the need of glass of very high refractive index.

The following examples are offered to illustrate the teachings of this invention (Examples 1 to 3 inclusive being particularly drawn to reflex-reflecting embodiments thereof), but are not to be construed as limitative of the scope thereof.

*Example 1*

The following formulation is well adapted for spray application as a paint on a suitable surface. Upon drying, it gives a near white appearance under normal daytime viewing, and yet provides a brilliant reflector under reflex-reflecting nighttime conditions. The hemispherically reflectorized glass beads in a dried coating of this composition are randomly oriented, some with their hemispherical coatings facing outwardly, but a large proportion are positioned with at least a portion of the hemispherical coatings next to the surface that is coated; and thus they are in suitable optical relationship for light rays to pass into the glass beads from an external source and be reflected by the hemispherical reflectors on the beads.

| | Percent by weight |
|---|---|
| Hemispherically reflectorized glass beads of 1.9 refractive index (diameter range of 20–50 microns) | 33.7 |
| Polyamide modified alkyd resin (gelled with 60% mineral spirits) | 21.35 |
| Metal naphthanate driers (40% solids) | 0.30 |
| Mineral spirits (thinner) | 12.25 |
| Naphtha (V.M. & P.) | 8.25 |
| Anti-skinning agent | 0.15 |
| White pigment particles (diameter range of 2 to 40 microns) | 24.0 |

Hemispherically reflectorized glass beads of such minute size as here contemplated may be formed by coating a layer of the beads on a carrier web having a non-volatile plastic tacky surface (such as a plasticized resin layer), pressing the coated beads partially into the layer, brushing off any excess, and then passing the bead-coated carrier web through a region of a high-vacuum where it is subjected to metal vapors such as those of aluminum. The exposure time is sufficient for a thin opaque reflective coating of metallic aluminum (or other metal) to be deposited on the exposed portion of the spheres of the coating. The plastic on the web is then dissolved away or passed through a hot water bath to release the hemispherically reflectorized beads. Hemispherically reflectorized beads are further disclosed in copending application, Serial No. 503,837, filed April 25, 1955, by Philip V. Palmquist and Warren R. Beck, now Patent No. 2,963,378, the disclosure thereof being here incorporated by reference.

A preferred polyamide modified alkyd resin, which is desirable because of its thixotropic property, is available under the trade name "Burnok," and is believed to be disclosed in U.S. Patent No. 2,663,649. Metal naphthanate varnish driers are well known to the art (e.g., a mixture of cobalt, manganese and lead naphthanates). Anti-skinning agents are also well known in the varnish art and are used to prevent or minimize the formation of a surface skin over the composition in a container.

The opaque white pigment particles in this formulation were formed as follows: 20 parts of standard titanium dioxide pigment (which has an average particle size of about 0.3 micron) was mixed with 25 parts of "S-35" brand sodium silicate (having a ratio of $Na_2O$ to $SiO_2$ of about 1:3.75, and a concentration of 32% by weight in water), and 15 parts additional water. The slurry was pumped through a spray nozzle at an atomizing pressure of 60 pounds per square inch gauge into a large drying chamber. Tiny spherical clusters of desired size and consisting of titanium dioxide bonded together with sodium silicate were formed. The sodium silicate gelled rapidly and dried sufficiently so that the clusters did not stick together as they dropped freely and were collected in a hopper. The clusters were then removed from the hopper and placed in a 25% solution of ammonium chloride in water (5 parts by weight of the clusters for every 4 parts of the ammonium chloride solution) and heated approximately one hour at 200° F. to neutralize excess alkalinity of the sodium silicate binder. The clusters were then filtered from the ammonia water and washed several times with hot water. Next, they were dried at about 250°–300° F. until a free flowing powder was obtained. This usually takes about 8 to 16 hours. Then, to insure that all the entrapped moisture and any ammonium salts were removed, the particles were fired at a temperature between 680 and 1200° F. for approximately 1½ hours. Rapid cooling with agitation assisted in the development of maximum whiteness in the particles. Coarser particles were removed by screening the batch of particles through a 400 mesh sieve to obtain a mass of particles in the size range of at least 2 microns up to about 40 microns.

The formulation of this example was made by charging the alkyd resin gel into a mixing kettle and vigorously agitating. The naphtha and mineral spirits were slowly added with mixing and heating to 100° F. to obtain a smooth mixture. Then the naphthanate drier and anti-skinning agent were added and worked in. Next the pigment particles were stirred into the mixture; and as the batch cooled and became more viscous, the glass beads were stirred in and dispersed.

The weight and volume percentages on a dry solids basis (disregarding all volatile components) are the same as in a dried coating and are as follows:

|  | Percent Weight | Percent Volume |
|---|---|---|
| Glass beads (hemispherically reflectorized) | 50.78 | 35.46 |
| White pigment particles | 36.17 | 33.23 |
| Varnish solids | 13.05 | 31.31 |

Thus it is evident that the bead plus pigment volume concentration is approximately 68.7% and that the volume ratio of beads to pigment particles is approximately 1:1. Varnish solids account for approximately 20.5% by weight of the total vehicle.

*Example 2*

This formulation contains metal flakes instead of the hemispherical reflectors about beads as in Example 1.

The metal flakes of this formulation serve to provide a reflective surface behind the glass beads after the composition is coated out and dried. A dried coating of this composition exhibits an attractive light-gray metallic color and substantially the same brilliance and angularity of reflex-reflection as the composition of Example 1. Such a result is particularly surprising inasmuch as the reflective metal flakes in this composition must shift in position as the coating dries and orient themselves near or contiguous to the rear surfaces of the beads in a coated layer, while simultaneously permitting suitable readjustment of glass beads and nonmetallic pigment color particles in the coating as discussed herein.

|  | Parts by weight |
|---|---|
| Glass beads of 1.9 refractive index (diameter range of 20 to 50 microns) | 50.0 |
| Polyamide modified alkyd resin of Example 1 | 19.0 |
| White pigment particles of Example 1 | 13.0 |
| Metal naphthanate driers (40% solids) | 0.30 |
| Mineral spirits (thinner) | 7.6 |
| Naphtha (V.M. & P.) | 7.5 |
| Anti-skinning agent | 0.1 |
| Aluminum flake | 2.5 |

The composition is compounded as described in the preceding example. The aluminum flake is blended in at the time of adding the metal naphthanate driers and anti-skinning agent.

A preferred type of aluminum flake is an extremely fine aluminum leafing powder, also known as fine lining aluminum flake, of which 1 gram covers a surface area of 25,000 square centimeters. If desired, the aluminum flake powder may be blended by ball milling with an approximately equal portion of the varnish vehicle for about 16 hours or longer to improve the ease of uniformly dispersing it in the composition.

Various metal flake powders may be employed and provide efficient metallic (shiny) reflection. The particle size must be substantially less than the particle size of glass beads employed. The flakes of metal permit of pigment leafing. Aluminum powder leafing pigments, preferably extremely fine, are desirable because of relatively low cost in relation to high efficiency, but other metal flake pigments or powders may be used such as bronze powder, copper flake, tin flake, German silver flake, nickel flake, and even gold and silver leaf, although too expensive for ordinary usage. The optimum proportion is one that suffices to provide complete reflective areas at the backs of the beads without substantial excess of flake serving no useful purpose, and this will vary depending upon the particular flake powder employed, size of beads, color pigment particles, etc., but can readily be determined by trial in any given case. In general, it has been found that the optimum value lies in the range of about 1 part by weight of metal flake powder per 5 to 50 parts by weight of glass beads (the optimum being about one part flake powder per 20 parts by weight of beads), although as little as 1 part flake powder to 200 parts of glass beads may be useful when extremely fine aluminum leafing powder is employed. Reflex-reflecting compositions containing metal flake reflectors are described in detail in my copending application, Serial No. 591,305, filed June 14, 1956 now abandoned in favor of Serial No. 147,747, filed October 26, 1961.

The bead plus nonmetallic pigment color particle volume concentration of the composition of this example is 68.8%, and the volume ratio of beads to nonmetallic pigment particles is approximately 3:1.

*Example 3*

Increased brilliance of reflex-reflection and vividness of daytime coloration may be obtained by employing a two-coat system wherein the first coat (Formulation A) consists of a composition containing a very bright metal flake; and the second coat (Formulation B) consists of a composition containing transparent glass beads and nonmetallic pigment color particles as taught herein.

| Formulation A: | Parts by weight |
|---|---|
| Cellulose acetate butyrate | 6.3 |
| Siliconeresin solution (60% solids in toluene) | 2.4 |
| Di(2-ethylhexyl)phthalate plasticizer | 1.6 |
| Solid acrylic resin | 1.3 |
| Diacetone alcohol | 26.5 |
| Ethylene glycol monoethyl ether acetate ("Cellosolve acetate") | 15.1 |
| Methyl ethyl benzene solvent mixture ("Penola 100") | 25.6 |
| Coarse aluminum leafing flakes | 21.0 |
| Finely divided amorphous silica adsorbent | 0.2 |

A suitable silicone resin solution is available under the trade designation "DC840," and is a silanol or siloxanol resin polymer (3 to 4% silicon atom bonded hydroxyl groups) dissolved in 40% toluene. Its viscosity at room temperature is approximately 20 centipoises. The ratio of organic groups to silicon atoms in this resin is characteristically low as in the case of other silicone resins which cure to a hard state (e.g., a ratio of organic groups to silicon atoms at least below 1.9); and at least some of the organic groups are methyl, and some phenyl. The resin is compatible with cellulose acetate butyrate and the acrylic resin component. It promotes wetting or flow out of the composition. Polymers and copolymers of the lower alcohol esters of acrylic acid and methacrylic acid are useful as the acrylic resin component (e.g., "Acryloid 72").

Formulation A was compounded using the following procedure: The cellulose acetate butyrate and acrylic resin component were slowly added and stirred into a mixture of the Cellosolve acetate and approximately ¾ of the diacetone alcohol until dissolved. Then the "Penola 100" solvent mixture was added with stirring. Next the silicone resin and the plasticizer were added and stirred in to form a uniform mixture. Finally the aluminum flakes and silica adsorbent were added and the mixture stirred or agitated to obtain a uniform dispersion. Remaining diacetone alcohol was added to adjust the viscosity of the composition.

The composition had a viscosity between 5000 and 7000 centipoises at 77° F. and a density of about 8.7 pounds per gallon. Approximately 64% of the solids content of the composition is aluminum flake. When the composition is coated on a surface such as by conventional silk screen processing, it leaves on drying an opaque coating which has an exceptionally bright leafed out surface appearance with high specular reflection. Since the dried coated film contains only about 36% by weight varnish solids, very little resin lies on top of the leafed aluminum particles of the layer. Also, the resin itself is very clear and exhibits a refractive index of approximately 1.48 which aids in obtaining brilliance of reflex-reflection in the final structure formed according to this example.

Formulation B:  Parts by weight
Nitrocellulose mixture (5000 second viscosity type wet with 35% ethanol) ____ 1.25
Dibutyl phthalate _____ 0.15
Butyl alcohol _____ 0.95
Xylene _____ 7.90
Butyl lactate solvent _____ 10.45
Alkyl ammonium montmorillonite ("Bentone 18C") _____ 0.50
Ethylene glycol monoethyl ether (Cellosolve)_ 1.50
Short to medium oil length soya modified alkyd resin solution (50% solids in a solution of mixture of methyl ethyl benzene solvents) _____ 14.1
Transparent benzidine yellow pigment _____ 0.20
Opaque yellow color particles (diameter range of 2 to 50 microns) _____ 12.0
Yellow glass beads of approximately 1.9 refractive index (diameter range of 35 to 75 microns) _____ 48.0
Diacetone alcohol _____ 3.0

Formulation B is prepared by mixing a high viscosity lacquer base (10,000 to 15,000 centipoises) consisting of the nitrocellulose mixture, dibutyl phthalate plasticizer, butyl alcohol, xylene, and a major portion of the butyl lactate. A mill base containing the suspending agent, alkyl ammonium montmorillonite, was formed by milling the montmorillonite with the Cellosolve and a small portion of the alkyd resin solution on a three-roll paint mill. A further mill base was formed by ball milling the transparent benzidine yellow pigment with a small portion of the high viscosity lacquer base diluted with the remaining butyl lactate. To the high viscosity lacquer base was then blended the remaining portion of the compatible short to medium oil length soya modified alkyd resin solution (a product having the trade name "Beckosol 1307"). Next the mill base containing the alkyl ammonium montmorillonite was blended in. The batch was heated to about 140–150° F. for about 4 hours with constant mixing to insure a homogeneous blending of the ingredients. Then, the yellow pigment particles, glass beads, and the mill base containing the transparent benzidine yellow pigment were added and thoroughly mixed into the composition. The final batch was adjusted to desired viscosity by addition of the diacetone alcohol, approximately 3% being employed in this example.

The resulting composition had a bead plus pigment color particle volume concentration of about 70.0%, and a volume ratio of beads to nonmetallic pigment of about 4:1.

This composition may be screen processed, printed or otherwise coated over a shiny reflective surface such as one formed using the composition set forth above in Formulation A, to yield an essentially monolayer of glass beads with colored pigment particles distributed between the beads of the layer. The resulting dried composite yields a strong yellow daytime appearance and a bright yellow reflex-reflective appearance when viewed at night near the beam of an incident ray of light.

It is therefore evident that this invention provides, for the first time, insofar as I am aware, conveniently used mobile compositions which may be applied in situ upon various surfaces to form reflex-reflecting signs and markers which also exhibit desired coloration. The simplicity of accomplishing such a result is particularly surprising in view of the fact that earlier work in the art of reflex-reflection tends to indicate that the result itself cannot be accomplished. Out of this surprising discovery flows a striking benefit: it is now possible to paint signs and markers on railroad box cars (as well as on a multitude of other objects) so that they give a daytime visual appearance essentially indistinguishable (as far as color alone is concerned) from past colored signs and markers, but which in addition exhibit brilliant reflex-reflection at nighttime when viewed near the beam of incident light.

It is emphasized that preferred spheroidal pigment clusters disclosed herein are distinct from any pigment particles heretofore known. An interesting feature of these spheroidal pigment particles is that of apparent porosity in an optical sense. They are, as illustrated particularly in Example 1 hereof, composed of pigment powders held together in a spheroidal cluster by an essentially transparent binder. Apparent optical porosity is gained by the transparency of the binder, which permits some light rays to penetrate into the pigment cluster. Such light rays are absorbed or refracted and reflected in a complex manner, depending on the particular pigment powder in a cluster and the binder selected therefor. Attractive visual effects are thus gained, particularly when these spheroidal clusters are coated as part of a paint composition in a layer on an underlying substrate. While solid spheroidal colored pigment particles of the special size range discussed may be relied upon as part of a paint coating to give improved flatness appearance to the dried coating, a more attractive coating of greater "flatness" appearance is gained by using clusters. Clusters as here discussed have been used in paint compositions which on drying as a coating have provided an attractive and rich velvet-like appearance (but distinct from most velvets in that even the readily-observable sheen of such velvets at certain angles of viewing is missing) which on visual inspection leads one to utterly discount that the coating itself could ever be a paint. Yet it is a paint, and possesses all the advantages (cleanability, wearability, protection, etc.) of a paint coating.

A drawing made a part hereof illustrate graphically the high order of flatness exhibited by paint coatings resulting when flat paint compositions of this invention are used (solid line) as compared to a heretofore known commercial flat paint composition (dash line) and magnesium carbonate (points in squares). In order to distinguish the relative brightness (i.e., flatness) curves for each surface between observation angles of minus 60° and plus 60°, and yet constrict the relative brightness curves at observation angles greater than 60° (both plus and minus) so as to permit illustration in a single graph, a logarithmic scale is used for the ordinate of the graph.

The following non-limitative example is offered to illustrate the flat paint embodiment of this invention.

*Example 4*

Parts by weight
Polyamide modified alkyd resin (gelled with 60% mineral spirits) _____ 23.2
White pigment particles (diameter range of 3 to 40 microns) _____ 54.0
Metal naphthanate driers (40% solids) _____ 0.32
Mineral spirits (thinner) _____ 13.32
Naphtha (V.M. & P.) _____ 9.0
Anti-skinning agent (e.g., butyraldoxime) _____ .16

The ingredients employed, other than the white pigment particles, are all well-known ingredients for paint compositions and need no further disclosure here. All ingredients of this formula are illustrated and discussed in Example 1, supra.

Blending of the ingredients to form a paint composition was accomplished according to conventional practice, as illustrated in Example 1.

The formulation illustrated had a Pigment Volume Concentration, by which is meant the ratio of the volume of the pigment over the total of the pigment volume and varnish solids volume, of about 68.7%. Preferably Pigment Volume Concentration for "flat" paints such as illustrated will lie in the range of about 50 to 85%. However, useful compositions of varied rich flat appearance may be formulated outside the aforenoted limits, which is a concept earlier discussed in connection with the compositions particularly illustrating the reflex-reflecting embodiments hereof.

Referring now to the drawing, the goniophotometric solid-line curve represents the relative brightness of reflectance (i.e., the flatness) of a surface covered with a dried coating of the paint composition of this Example 4, as compared to (a) the dash-line curve for a standard commercial flat paint ("Liquid Velvet") well recognized as being one of the better flat paints of present day commerce, and (b) the dot-in-square curve for magnesium carbonate, a flat surface frequently used as a standard. The relative brightness of reflectance of each coating was measured at various angles as plotted along the abscissa of the graph, using an incident light beam projected on the surface of each coating at an angle of 80° from normal (see left of graph where breaks in the observation curves indicate the location of the light source).

It might be noted that, as the angle of incident light projected approaches normal, the differences in relative brightness of reflection (measured at various observation angles) become less between the flat paint coatings of this invention, the better flat paint of present day commerce, and magnesium carbonate. It is, however, the brightness of reflectance of near parallel incident light (e.g., 60°–85°), viewed at various angles (particularly those about equal but opposite to the incident beam), which becomes the more significant in connection with the attractiveness and uniform appearance of a surface coated with a flat durable paint covering. It is at viewing angles essentially equal but opposite to near parallel incident beams that flat paints formulated as heretofore known (as illustrated by dash-line curve in the drawing) tend to exhibit a glare or sheen. Such glare or sheen causes the color of a coating to appear essentially washed out, since the observer receives a high reflection of light. Note the relatively large area beneath the dash-line curve in the right side of the graph. Also, note that such glare of the commercial flat paint tested (peaking at a relative brightness value of 16,500 at plus 87°) was more than 5 times the minor glare or sheen of the coating of this Example 4 (peaking at a relative brightness of 3,550 at plus 88°), when each was viewed at angles opposite to the incident beam. As a practical matter, the fact that the solid-line curve tends to slightly increase (as compared to the great increase for prior art flat paint coating) at angles of viewing opposite the incident beam is not particularly evident to the naked eye. Further of significance is the fact that the flat paint hereof tends to exhibit no glare or sheen at much higher angles of viewing opposite a source beam than the prior art paint coating or the surface of magnesium carbonate. Thus, the angularity for any manifestation of glare or sheen from the surface covered with the paint hereof is much more critical, becoming essentially unnoticed by the average observer under the usual viewing conditions. It is also interesting to observe that even the magnesium carbonate surface, widely used as a standard for flatness, exhibits a glare at plus 60° about twice that of the coating of this Example 4. Note that the glare of the prior art flat paint coating at plus 60° is even greater.

Also surprising is the phenomenon of light return exhibited by my coatings at angles near and surrounding a source beam directed upon them. Such light return is not explained by the usual principles of reflex reflection as applied to glass beaded reflectors. In point of fact, the light return is of an entirely different order than that high magnitude of light return commonly associated with reflex reflection. But as may be observed from the drawing, the relative brightness of reflectance for this Example 4 coating at angles near the incident light beam (left portion of graph varies up to about 4 times that of the prior art flat paint tested under the same conditions. Thus coatings of the paints hereof do not appear darker when viewed near a high angularity incident beam, whereas prior art coatings appear much darker under such angular viewing as compared to their color when viewed at angles near normal to their surface.

It might be observed that, relatively speaking, the light return as observed near an incident near parallel beam directed upon flat paint coatings hereof exhibits some tendency to approach that light return exhibited by these coatings at observation angles opposite to an incident near parallel beam. This phenomenon together with essentially uniform (to the naked eye) light return at various angles of viewing between extremes becomes particularly interesting in that, for the first time insofar as I am aware, ceilings may be made to appear flat but essentially uniformly bright and uniformly colored even when illuminated by point sources of indirect lighting as is commonly done. It is a matter of common knowledge that flat ceiling paints of present day commercial use tend to appear washed out, or slightly dirty to the observer looking up into corner areas or other areas most remote from sources of illumination such as a chandelier. When a ceiling is covered with flat paint compositions of this invention, it appears to the observer to be essentially uniformly flat, bright and colored over all areas thereof, even when illuminated by a point source of lighting such as a chandelier. In effect a much more uniform diffusion of light striking the surface of the paint film of this invention is accomplished as compared to that resulting when prior art flat paint films are used.

Worthy of note is the fact that flatness in combination with durability and non-dusting is achieved by using the teachings hereof. Heretofore flatness has generally been achieved in paints by increasing the Pigment Volume Concentration of the paint composition, sometimes to the point of starving the pigment of varnish in an applied coating, and thus creating dusting problems. Everyone is familiar with the flat appearance of calcimine, and the extreme dusting it exhibits. This invention, however, permits one to achieve flatness without sacrificing adequate varnish solids to bond the pigment clusters against dusting. Thus a durable paint coating free of such dusting problems is formed. If accidentally or intentionally marked with a pencil or crayon, the coated surface may be scrubbed to remove the mark; and shining of the surface by such scrubbing action, which is a common fault of heretofore employed commercial flat paints, is essentially avoided. This is particularly important in connection with the use of the flat paints hereof in applications where cleanability is required with retention of flatness, as in the case of dashboard coverings for automobiles.

Scrubbability or cleanability of the flat paint coatings of the invention essentially without destroying the flatness thereof may in part be attributed to the fact that the pigment of the coating is in the form of porcelain spheroidal pigment clusters. The inorganic binder of preferred clusters is, of course, highly resistant to abrasive removal. However, where resistance to abrasive removal or destruction during cleaning is less critical, transparent organic resin binders may be employed to form the pigment clusters for the paint composition. From the standpoint of durability and resistance to destruction during cleaning, when organic binders are selected, it is preferable to employ suitable resin and curing agent blends, and to cure the resin in each cluster while the clusters are free-falling so as to avoid cohesion between the spheroidal clusters. Of course, varnish vehicles and diluents for paints employing clusters having organic binders (or inorganic binders, for that matter) will be selected for their non-solvating properties.

A further advantage of this invention is that, for the first time insofar as I am aware, metallic finishes may be formed exhibiting a flatness commonly considered impossible to achieve in combination with metallic appearance. The following example particularly illustrates this type of paint composition.

*Example 5*

| | Parts by weight |
|---|---|
| Finely divided aluminum flake pigment | .25 |
| Phthalocyanine blue pigment | 2.2 |
| Translucent blue pigment spheroidal clusters (diameter range of 2 to 50 microns) | 44.3 |
| White pigment cluster particles (diameter range of 2 to 50 microns) | 2.2 |
| Polyamide modified alkyd resin (gelled with 60% mineral spirits) | 28.4 |
| Mineral spirits (thinner) | 11.1 |
| Naphtha (V.M. & P.) | 11.1 |
| Anti-skinning agent | .15 |
| Metal naphthanate driers (40% solids) | .3 |

The ingredients employed, other than the first three listed, were exactly as those employed in Example 4 hereof. Blending of the ingredients to form a paint composition was accomplished according to conventional practice as illustrated in Example 1.

Finely divided aluminum flake pigment was selected as a preferred type of specular-reflecting metallic pigment for the composition; but it should be noted that any of a variety of finely divided specular-reflecting metallic pigments (e.g., gold, silver, copper, etc.) may be employed in a composition such as illustrated.

Translucent blue pigment spheroidal clusters were formed by blending 5 parts by weight of water-dispersible phthalocyanine blue pigment particles (a product identified by the trade-mark "Monastral BWD") with 10 parts water, and then blending the resulting mixture with 200 parts of the sodium silicate solution identified in Example 1. Subsequent processing was as described in Example 1, except that the heating temperatures were never allowed to exceed about 250° F. Higher temperatures tend to alter the color of the heat-sensitive organic pigment particles here dispersed in the transparent silicate binder.

The Pigment Volume Concentration of this example was about 70%. In calculating the Pigment Volume Concentration, both the aluminum flake pigment and phthalocyanine blue pigment as well as the blue and white spheroidal pigment clusters were included.

A surface painted with the composition of this example exhibits a metallic blue color of surprising flatness. It exhibits surprising depth and richness and trueness (i.e., uniformity) of color under a wide range of viewing angles without the high metallic sheen usually exhibited by metallic finishes. It is diffuse reflecting and yet exhibits some specular metallic reflection as a result of the very small amount of metallic pigment therein. Its curve of relative brightness of reflection closely approximates that for Example 4 hereof. As in the case of the Example 4 coating, this metallic finish coating does not appear washed out at relatively high angular viewing opposite a source beam and does not appear darker at high angular viewing near a source beam.

Paint compositions of the type illustrated in Examples 4 and 5 may be formed employing any of a variety of colored spheroidal pigment clusters, and mixtures thereof, for desired color effects, as discussed earlier in connection with the reflex-reflecting embodiment hereof. Black coatings formed by using compositions containing black pigment clusters of the type illustrated have been found to be particularly striking. They absorb essentially all light directed thereon and exhibit a flat richness of appearance that never before, insofar as is known, has been associated with a paint coating.

Of course, any of a variety of transparent varnish vehicles (e.g., acrylics, vinyls, epoxies, alkyds, etc.) may be used as the varnish base for these paint compositions. These compositions may also contain conventional paint ingredients, employed either for the attractive visual effects produced or the improvements they impart to a paint composition from the standpoint of applying it to a surface. Thus, the paint compositions may be emulsified with water for application to absorptive surfaces such as paper. A small amount of conventional pigment particles of commerce may be included in these flat paint compositions without seriously upsetting their properties as discussed herein.

Conversion of the flat-type finishes formed by coating and drying compositions such as illustrated in Examples 4 and 5 into semi-glossy or highly glossy finishes is also possible, and is conveniently accomplished by painting a top-coat of transparent varnish base material over the flat finishes. The result is rather surprising in that the coating takes on a richness of depth not heretofore believed possible by simple painting expedients as discussed. In addition, the resulting coating retains trueness of color over a much wider range of viewing angles than prior art glossy finishes. The latter tend to darken relatively quickly as one approaches relatively acute viewing angles near an incident beam, or appear washed out as one approaches relatively acute viewing angles opposite an incident beam.

In addition to those uses where attractive decorative textured effects are desired (e.g., signs, housings for apparatus, appliance medallions, automobile bodies and trim, etc.), the paint compositions hereof (particularly black) may be used to coat the interior of optical instruments such as cameras, telescopes, microscopes, etc. They also may find use in military camouflage applications.

That which is claimed is:

1. A paint-like coating composition inherently adapted to provide, immediately upon drying as a coating, a reflex-reflecting surface layer which appears attractively colored under normal daytime viewing, said composition consisting essentially of a mixture of transparent varnish vehicle comprising non-volatile film-forming binder material, hemispherically reflectorized transparent glass microspheres having a refractive index of at least about 1.8, and nonmetallic chemically inert colored crumble-resistant pigment particles of a size distribution within the range of 2 to 70 microns diameter and essentially free of fines smaller than 2 microns in diameter.

2. A paint-like coating composition inherently adapted to provide, immediately upon drying as a coating, a reflex-reflecting surface layer which under normal daytime viewing exhibits attractive coloration, said composition consisting essentially of a mixture of transparent varnish vehicle comprising non-volatile film-forming binder material, transparent glass microspheres having a refractive index of at least about 1.8, finely divided reflective metal flake powder of a size smaller than said microspheres, and nonmetallic chemically-inert colored crumble-resistant pigment particles of a size distribution within the range of 2 to 70 microns diameter and essentially free of fines smaller than 2 microns in diameter.

3. A paint-like coating composition inherently adapted to provide, immediately upon drying as a coating, a colored surface layer of optically exposed transparent glass microspheres available for reflex-reflection in combination with optically exposed pigment particles for coloration of the coating, said composition consisting essentially of a mixture of transparent varnish vehicle comprising non-volatile film-forming binder material, transparent glass microspheres having a refractive index of at least about 1.8, and nonmetallic chemically-inert colored crumble-resistant pigment particles of a size distribution within the range of 2 to 70 microns diameter and essentially free of fines smaller than 2 microns in diameter.

4. A paint-like coating composition inherently adapted to provide, immediately upon drying as a coating, a colored surface layer of optically exposed transparent glass microspheres available for reflex-reflection in combination with optically exposed pigment particles for coloration of the coating, said compositon having as its base a mixture consisting essentially of a transparent varnish vehicle comprising non-volatile film-forming binder material and transparent glass microspheres having a refractive index of at least about 1.8, the composition additionally including a multitude of nonmetallic chemically-inert colored crumble-resistant pigment particles dispersed in said base, said pigment particles being of a size distribution in the range of 2 to 70 microns diameter and essentially free of fines smaller than 2 microns in diameter.

5. A paint-like coating composition inherently adapted to provide, immediately upon drying as a coating, a colored surface layer of optically exposed transparent glass microspheres available for reflex-reflection in combination with optically exposed pigment particles for coloration of the coating, said composition having as its base a mixture consisting essentially of a transparent varnish vehicle comprising non-volatile film-forming binder material, and transparent glass microspheres having a refractive index of at least about 1.8, some of said glass microspheres having a refractive index of approximately 1.9 and others having a refractive index of approximately 2.5, the composition additionally including a multitude of nonmetallic chemically-inert colored crumble-resistant pigment particles dispersed in said base, said pigment particles being of a size distribution in the range of 2 to 70 microns diameter and essentially free of fines smaller than 2 microns in diameter.

6. A paint-like coating composition inherently adapted to provide, immediately upon drying as a coating, a colored surface layer of optically exposed transparent glass microspheres available for reflex-reflection in combination with optically exposed pigment particles for coloration of the coating, said composition having as its base a mixture consisting essentially of a transparent varnish vehicle comprising non-volatile film-forming binder material, and transparent glass microspheres having a refractive index of at least about 1.8, the composition additionally including a multitude of nonmetallic chemically-inert colored crumble-resistant pigment particles dispersed in said base, said pigment particles being of a size distribution in the range of 2 to 70 microns diameter and essentially free of fines smaller than 2 microns in diameter, and said composition further having a Bead plus Pigment Volume Concentration in the range of about 50 to 85%.

7. A paint-like coating composition inherently adapted to provide, immediately upon drying as a coating, a reflex-reflecting surface layer which appears attractively colored under normal daytime viewing, said composition consisting essentially of a mixture of transparent varnish vehicle comprising non-volatile film-forming binder material, hemispherically reflectorized transparent glass microspheres having a refractive index of at least about 1.8, and nonmetallic chemically-inert colored crumble-resistant pigment particles of a size distribution within the range of 2 to 70 microns diameter and essentially free of fines smaller than 2 microns in diameter, said composition having a Bead plus Pigment Volume Concentration in the range of about 50 to 85% and a volume ratio of said microspheres to said pigment particles between about 1:4 and 9:1.

8. A paint-like coating composition inherently adapted to provide, immediately upon drying as a coating, a reflex-reflecting surface layer which under normal daytime viewing exhibits attractive coloration, said composition consisting essentially of a mixture of transparent varnish vehicle comprising non-volatile film-forming binder material, transparent glass microspheres having a refractive index of at least about 1.8, finely divided reflective metal flake powder of a size smaller than said microspheres, and nonmetallic chemically-inert colored crumble-resistant pigment particles of a size distribution within the range of 2 to 70 microns diameter and essentially free of fines smaller than 2 microns in diameter, said composition having a Bead plus Pigment Volume Concentration in the range of about 50 to 85%, a volume ratio of said microspheres to said pigment between about 1:4 and 9:1, and a quantity of said reflective metal flake powder in the range of about one part of the same for between about 5 and 50 parts by weight of said microspheres.

9. A mass of spheroidal chemically-inert crumble-resistant pigment clusters within the size distribution range of 2 to 70 microns in diameter, each said crumble-resistant cluster consisting essentially of pigment powder particles of an average size below 2 microns bonded together by a non-tacky transparent organic binder.

10. A mass of porcelain spheriodal chemically-inert crumble-resistant pigment clusters within the size distribution range of 2 to 70 microns in diameter, each said crumble-resistant cluster consisting essentially of pigment powder particles of an average size below 2 microns bonded together by a transparent porcelain binder.

11. A mass of spheroidal chemically-inert crumble-resistant pigment clusters within the size distribution range of 2 to 70 microns in diameter, each said crumble-resistant cluster consisting essentially of pigment powder particles of an average size below 2 microns bonded together by a transparent silica binder.

12. A paint-like coating composition comprising a transparent varnish vehicle comprising non-volatile film-forming binder material, and spheroidal chemically-inert crumble-resistant pigment clusters within the size distribution range of 2 to 70 microns in diameter, each said crumble-resistant cluster consisting essentially of pigment powder particles of an average size below 2 microns bonded together by a non-tacky transparent organic binder, material insoluble in said varnish vehicle.

13. A paint-like coating composition adapted to provide, immediately upon drying as a coating, an attractive flat diffuse-reflecting finish, said composition consisting essentially of a transparent varnish vehicle comprising non-volatile film-forming binder material and spheroidal chemically-inert crumble-resistant pigment clusters consisting essentially of pigment powder particles of an average size below 2 microns bonded together by a non-tacky transparent binder, said clusters lying within the size distribution of 2 to 70 microns diameter.

14. A paint-like coating composition inherently adapted to provide an attractive flat diffuse-reflecting finish immediately upon drying, said composition consisting essentially of transparent varnish vehicle comprising non-volatile film-forming binder material, and porcelain spheroidal chemically-inert crumble-resistant pigment clusters within the size distribution range of 2 to 70 microns in diameter consisting essentially of pigment powder particles of an average size below 2 microns bonded together by a transparent porcelain binder, and said composition having a Pigment Cluster Volume Concentration in the range of about 50 to 85%.

15. A paint-like coating composition comprising transparent varnish vehicle comprising non-volatile film-forming binder material, specular-reflecting metallic pigment, and spheroidal chemically-inert crumble-resistant pigment clusters within the size distribution range of 2 to 70 microns in diameter consisting essentially of pigment powder particles of an average size below 2 microns bonded together by a non-tacky transparent organic binder material insoluble in said varnish vehicle.

16. A paint-like coating composition which provides a flat diffuse-reflecting finish upon application and drying, comprising a transparent varnish vehicle comprising non-volatile film-forming binder material, and pigment particles in the form of chemically-inert crumble-resistant clusters lying within the size range of 2 to 70 microns, said composition being characterized by the feature that essentially all of said clusters consist of pigment powder particles of an average size below 2 microns bonded together by a transparent binder insoluble in said varnish vehicle.

17. A paint-like coating composition which provides a flat appearing metallic finish upon application and drying, the composition comprising a transparent varnish vehicle comprising non-voltage film-forming binder material, and pigment particles in the form of chemically-inert crumble-resistant clusters lying within the size range of 2 to 70 microns, said composition including a small amount of specular reflecting metallic flake pigment and being characterized by the feature that essentially all of said clusters consist of pigment powder particles of an average size below 2 microns bonded together by a transparent binder insoluble in said varnish vehicle.

18. A readily-flowable composition useful in making colored light-reflecting coatings, comprising a mass of transparent glass beads having a refractive index of at least about 1.8 and having a specular-reflecting metal coating on at least a part of the surface thereof, in admixture with a mass of chemically-inert crumble-resistant pigment clusters lying within the size range of 2 to 70 microns, said clusters consisting essentially of particles of pigment of an average size below 2 microns held in cluster form by an non-tacky transparent binder material.

References Cited by the Examiner
UNITED STATES PATENTS

| | | | |
|---|---|---|---|
| 2,231,467 | 2/1941 | Hanahan | 106—308 |
| 2,646,364 | 7/1953 | Porth | 106—193 |
| 2,879,171 | 3/1959 | Kullenberg | 106—193 |
| 2,850,403 | 9/1958 | Day | 106—307 |
| 2,963,378 | 12/1960 | Palmquist | 106—193 |
| 2,997,403 | 8/1961 | Searight | 106—193 |
| 3,053,676 | 9/1962 | Higbee | 106—193 |
| 3,062,621 | 11/1962 | Nelson | 23—202 |

ALEXANDER H. BRODMERKEL, *Primary Examiner.*

JOHN H. MACK, MORRIS LIEBMAN, *Examiners.*

A. LIEBERMAN, D. J. ARNOLD, *Assistant Examiners.*

UNITED STATES PATENT OFFICE
CERTIFICATE OF CORRECTION

Patent No. 3,251,704   May 17, 1966

Alfred H. Nellessen

It is hereby certified that error appears in the above numbered patent requiring correction and that the said Letters Patent should read as corrected below.

Column 2, line 7, for "2,362,634" read -- 2,326,634 --; column 7, line 31, for "may sprayed" read -- may be sprayed --; column 9, line 36, for "Example 1," read -- Example 1. --; column 10, line 38, for "Siliconeresin" read -- Silicone resin --; column 12, line 50, for "illustrate" read -- illustrates --; column 14, line 14, for "graph" read -- graph) --; column 18, line 52, for "binder," read -- binder --; column 19, line 24, for "non-voltage" read -- non-volatile --; column 20, line 13, for "an" read -- a --.

Signed and sealed this 15th day of August 1967.

(SEAL)
Attest:

EDWARD M. FLETCHER, JR.
Attesting Officer

EDWARD J. BRENNER
Commissioner of Patents